United States Patent Office 3,136,824
Patented June 9, 1964

3,136,824
SYNTHESIS OF ALKYL AROMATICS AND
CATALYST THEREFOR
Dimitrios V. Favis, Sarnia, Ontario, Canada, assignor to Esso Research and Engineering Company, a corporation of Delaware
No Drawing. Filed Nov. 17, 1961, Ser. No. 153,232
7 Claims. (Cl. 260—671)

This invention relates to a novel catalyst system and process for the telomerization of ethylene and an aromatic hydrocarbon to produced alkylated aromatic compounds and especially those suitable for the manufacture of detergents.

This application is a continuation-in-part of a co-pending application filed in the name of Dimitrios V. Favis on November 16, 1960, Serial Number 69,548, now U.S. Patent No. 3,097,246.

In the co-pending application referred to above, there is disclosed a novel process and catalyst system for the preparation of alkylated aromatic hydrocarbons. The process described therein comprises reacting an aromatic hydrocarbon with ethylene in the presence of a three-component catalyst system to obtain telomerization of ethylene and the aromatic compound thereby forming alkylated aromatic products. The catalyst referred to therein comprises (1) an alkyl compound of a metal of groups I to III of the periodic table; (2) a halide of a transition metal of groups IV–B, V–B, VI–B, and VIII of the periodic table; and (3) an alkylhalocycloalkane, preferably an alkylhalocyclopentane such as monochlorinated methylcyclopentane. As evidenced by the operative examples in the aforesaid application, substantial yields of polyalkylated benzene in the lubricating oil boiling range are obtained.

It has now been found that the catalyst and process described in said application can be modified to selectively convert benzene into monoalkylated aromatic compound boiling within the so-called detergent alkylate boiling range. It is well known that alkyl benzene compounds and especially monoalkylated benzene averaging between about 6–18 alkyl carbon atoms are desirable intermediates for the manufacture of alkyl aryl sulfonate detergents. However, current commercial processes for the manufacture of detergent alkylates require a number of steps including the preparation of an olefin having the desired chain length, e.g. 12 carbon atoms, and reaction of this relatively high molecular weights olefin with benzene in the presence of an alkylation catalyst such as aluminum chloride, hydrogen bromide, or the like, to obtain the dodecyl benzene precursor to sodium dodecyl benzene sulfonate detergents.

By the present process it is possible to start with ethylene and benzene as the sole reactants and obtain an n-alkyl aryl product having an average carbon chain length in the alkyl group which is suitable for conversion into alkyl aryl sulfonated detergents. It is recognized that polyalkylated aromatic compounds are not as satisfactory for detergent manufacture as the monoalkylated compounds such as produced by the present process from the standpoint of detergency and biodegradability.

The telomerization reaction can be described quite generally as a simultaneous growth and alkylation reaction wherein a plurality of ethylene mols are, in the presence of the catalyst system to be described herein, added onto the benzene nucleus.

The metal alkyl components of the present catalyst system have the following general formula:

$$RR'R''Me$$

R is a phenyl or alkyl group having 1–24 carbon atoms, either straight or branched chain. Preferably R is a lower alkyl and more preferably a $C_1$–$C_6$ alkyl. Where the valence of the metal is two or greater, then R' is the same as R or may be a halogen chosen from I, Br and Cl or H. R' may represent nothing in the event the metal has a valence of only 1. Where the valence of the metal is 3, R'' will have the same definition as either R or R'.

Me = a metal of groups I to III of the periodic table such as Li, Na, K, Mg, Ca, Sr, Ba, Al, Ga, and In; with Al preferred.

The preferred compound is triethyl aluminum although diethyl aluminum chloride has also been found to be highly advantageous. Other metal alkyl compounds which may be employed include dipropyl aluminum chloride, triisobutyl aluminum, diethyl aluminum hydride, ethylbutylhexyl aluminum, diethyl aluminum chloride, dibutyl aluminum chloride and ethyl aluminum dichloride. These are illustrative only and not intended as limiting. Many other metal alkyl compounds of this general class are also employable with good results.

The metal halide component of the catalysts of the invention has the following general formula:

$$MX_a$$

where

M = a transition metal of groups IV–B, V–B, VI–B, and VIII of the periodic system such as Ti, Zr, V, Cr, Mo, W, and Fe, preferably Ti;
X = a halide, preferably Cl; and
a = valence of M, e.g. 2 to 4.

The preferred compound is titanium tetrachloride. Examples of other metal halides which may be employed include $ZrCl_4$, $VCl_5$ and $CrCl_3$.

The third component of the catalyst is an alkylhalocyclopentane having the formula:

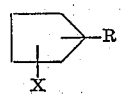

where

R = a straight or branched chain alkyl group having from 1 to 10 carbon atoms, preferably methyl; and
X = a halogen, preferably Cl.

The preferred compound is methylchlorocyclopentane.

It is interesting to note that chlorinated cyclopentane itself (i.e. no alkyl group) was totally ineffective as a catalyst modifier. Tertiary chlorides, i.e.

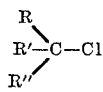

wherein R, R' and R" represent hydrocarbon radicals such as methyl, ethyl, propyl and so forth are moderately effective and may be employed in lieu of the alkylhalocyclopentane if desired.

The ratios of the various components in this system are preferably 1 mole of alkyl radicals of the metal alkyl compound combined with 0.05–0.99 mol of the halomethylcyclopentane combined with 0.2–10 or more mols, preferably 1–3 mols of the transition metal halide.

The catalyst may be employed in amounts as low as 0.5 gram, calculated as alkyl metal, per 100 grams of reacted ethylene. Larger amounts, i.e. up to about 5 grams or more of catalyst, calculated as alkyl metal, per 100 grams of reacted ethylene may be employed.

The paragraphs above describe the components of the catalyst system which are basically the same as disclosed in the above-identified copending application. In order, however, to obtain the novel results previously mentioned, namely the selective production of monoalkylated aromatic compounds, it has been found necessary to pretreat the catalyst in a specific manner to be defined. The catalyst is first prepared by contacting the halohydrocarbon, i.e. alkylchlorocycloalkane or tertiary alkyl halide with the alkyl aluminum compound at temperatures from ambient to 150° F., preferably 50–130° F., and more preferably 60 to 100° F. for about 1 to 10 minutes or less to form a catalyst reaction product mixture referred to herein as a complex. The transition metal halide is then added at generally the same temperatures or at least within the above temperature range to obtain the catalyst system.

Subsequent to the combination of the three components, a pretreatment which involves maintaining the catalyst system at elevated temperatures in the presence of ethylene for a time sufficient to alter or modify the catalyst system, provides a novel catalyst system capable of catalyzing the specific reactions contemplated herein. The pretreatment comprises subjecting the three-component catalyst system to a temperature above 70° F. and below 150° F., more preferably 100–140° F. for a period of about 1–10 minutes in contact with sufficient ethylene to assure the necessary modification of the catalyst. For example, an ethylene pressure of 0 to 100 p.s.i.g. or higher may be employed. Subsequently the telomerization reaction is carried out at a temperature lower than the pretreat temperature employed, e.g. below about 95° F., and preferably below about 75° F. Temperatures as low as the freezing point of benzene may be employed. A crucial step in the preparation of monoalkylated benzenes involves pretreating the catalyst at temperatures higher than those employed for the main reaction. It is pointed out that while there is a preference for the formation of the catalyst prior to the reaction proper, it is nevertheless feasible and in some cases desirable to prepare the catalyst system in situ, i.e. in the presence of the aromatic reactant as well as ethylene. If desired an inert diluent may be employed in the synthesis of the catalyst system, for dissolving the alkyl aluminum compound and/or for the principal reaction. The following diluents are typical of those which may be employed: n-hexane, n-heptane, cyclohexane, methylcyclohexane, methylcyclohepane, etc. In the main reaction ethylene pressures of from 100 mm. Hg or lower to 1000 p.s.i.g. or higher may be employed. In general, 70° F. may be considered as key temperature in two respects. It should be substantially exceeded in the pretreatment of the catalyst system and it is near optimum insofar as the main reaction temperature is concerned, if monoalkylated products are desired.

EXAMPLE 1

7 grams of $Et_3Al$ dissolved in 50 cc. of n-heptane solvent were introduced into a reactor containing 1075 cc. of dry benzene, the mixture being blanketed with dry nitrogen. 12 cc. of monochlorinated methylcyclopentane were then added as modifier to the system as a molar ratio to the $Et_3Al$ of 1.63. After these two catalyst components remained in contact for five minutes, $TiCl_4$ was added at a molar ratio of $TiCl_4$ to $Et_3Al$ of 2.9. The above operations were carried out at about 70° F. The mixture was stirred for a few minutes and it acquired a brownish color. At this stage, ethylene was introduced into the system at a rate of about 1.8 grams per minute and at a pressure of one atmosphere. The temperature of the reaction was then raised to about 130° F. and kept at this level for 45 minutes. Then the reaction temperature was lowered to 70° F. and it was maintained at this level for 120 minutes with ethylene partial pressure of one atmosphere. After the completion of the reaction, water was added to the system to destroy the catalyst. The hydrocarbon phase was filtered to remove solids and the filtrate was distilled to remove unreacted benzene. The products were further distilled to remove light products boling below 700° F., the remaining liquid product being principally polyalkylated benzene boiling in the lubricating oil range. The product distribution, in weight percent on otal products, was 49% of light fraction, i.e. boiling below 700° F., 32% of oil boiling above 700° F., and 19% of solid polyethylene. Gas chromatography of the light fraction indicated its composition to consist of various alkylates having alkyl chains varying from $C_2$ to $C_{12}$ and higher as shown in Table I. The olefin concentration was practically zero. Infrared spectroscopy indicated that these materials were predominantly monoalkylated benzenes.

To demonstrate the criticality of the catalyst system preheating step, reference may be had to Example 2 which does not embody the preheating step of the present invention.

EXAMPLE 2

The procedure of Example 1 was followed exactly with one exception. After the catalyst system was formed as evidenced by the brownish color, the temperature of the catalyst system was not raised above 70° F. The reaction product mixture of this example analyzed as follows, 10% light products, i.e. boiling below 700° F., 78% of oil boiling over 700° F. and 12% solid materials.

EXAMPLE 3

The procedure of Example 1 was followed except that the catalyst preheating time was reduced from 45 minutes to 25 minutes. There was obtained in this example an increase in the light product of from 49 to 61%, a decrease in the lubricating oil fraction from 33 to 31% and solids decrease of from 18 to 8%.

EXAMPLE 4

The procedure of Example 1 was followed except that a higher benzene to product ratio (volume/weight), a shorter preheat and reaction time were employed. In this case there was obtained 79% of light product and only 18% of heavier lubricating oil with the solids being reduced to 3%.

In the above examples approximately 40–45% of the light products referred to comprises detergent alkylate boiling between 500 and 700° F., the remaining fraction essentially boils below 500° F. and contains lower monoalkylated benzene having from 2–6 carbon atoms per alkyl group. Table I which follows indicates a typical breakdown of the light products referred to in Examples 1–4.

Table I

COMPOSITION OF LIGHT PRODUCTS USING A PREHEATED CAT. SYSTEM

| Alkylate [1] | Mole percent |
|---|---|
| $C_4$-phenyl | 14 |
| $C_6$-phenyl | 21 |
| $C_8$-phenyl | 20 |
| $C_{10}$-phenyl | 21 |
| $C_{12}$-phenyl | 11 |
| $C_{14}$-phenyl | 8 |
| $C_{16}$-phenyl | 5 |

[1] Mainly linear monoalkylate as shown by infrared spectroscopy, gas chromatography, and nuclear magnetic resonance.

To illustrate the differences between the various examples reference may be had to Table II which reports the data obtained in Examples 1–4.

Table II

| Example | 1 | 2 | 3 | 4 |
|---|---|---|---|---|
| Preheating: | | | | |
| Temp., °F | 130 | | 130 | 130 |
| Time, min | 45 | | 25 | 15 |
| Reaction: | | | | |
| Temp., °F | 70 | 70 | 70 | 70 |
| Time, min | 120 | 165 | 140 | 67 |
| Total reaction time, min | 165 | 165 | 165 | 82 |
| Benzene/product ratio (vol./wt.) | 3.0 | 2.5 | 3.0 | 4.9 |
| Product distribution, wt. percent: | | | | |
| Light products, <700° F | 49 | 10 | 61 | 79 |
| Oil, >700° F | 32 | 78 | 31 | 18 |
| Solids | 19 | 12 | 8 | 3 |
| Detergent alkylate (500/700°F.): Wt. percent on total products | | | 34 | 32 |

Addditional experiments were carried out to determine the effect of the variables in the process on the production of light alkylates and especially those boiling in the detergent alkylate range. In the following Table III, Examples 5 and 6 were carried out essentially as previously described with the conditions specified.

Table III

| Example | 5 | 6 |
|---|---|---|
| Conditions: | | |
| Alkyl-metal | $EtAlCl_2$ | $Et_3Al$ |
| $TiCl_4$/alkyl metal | 2.9 | 2.9 |
| Catalyst Preheat: | | |
| Temp., °F | None | 130 |
| Time, min | None | 15 |
| Reaction time at 70° F., min | 82 | 67 |
| Benzene/product ratio (vol./wt.) | 6.5 | 4.5 |
| Product distribution, wt. percent on total products: | | |
| Light alkylates, B.P. <700° F | 39.0 | 83.0 |
| Detergent alkylate, 500/700° F. ($C_8$–$C_{22}$ alkyl) | 28 | 33.5 |
| Oil | 61 | 8.7 |
| Solids | Trace | 7.6 |
| Amount of catalyst, wt percent alkyl metal based on product, percent | .5 | .5 |

Comparing Examples 5 and 6, it will be seen that where no preheat was employed, i.e. in Example 5, a total of 39% of the product was light alkylate with 28% being the detergent alkylate range, whereas 61% of the product boiled over 700° F. In Example 6, which represents one embodiment of the present invention, triethylaluminum was employed with the same titanium tetrachloride to alkyl metal ratio utilizing the same total reaction time but including both the use of Cl-MCP modifier and a 15-minute preheat treatment of the catalyst. In the process of this invention, as evidenced by Example 6, 83% of the product was light alkylate and 33.5% boiled in the detergent alkylate range with the production of only 8.7% of oil boiling over 700° F.

In comparing Examples 5 and 6 it is to be pointed out that the use of higher benzene to product ratios definitely favors the selective production of the monoalkylated product, so that the process of Example 6 utilizing higher ratios, e.g. 6.5 as employed in Example 5, should have resulted in an even greater production of monoalkylates.

The monoalkylated compounds referred to can be linear alkylates suitable for the manufacture of biodegradable detergents.

What is claimed is:

1. In a process for preparing monoalkylated aromatic compounds wherein benzene is reacted with ethylene in the presence of a catalyst system comprising an alkyl metal compound, a transition metal halide and an alkylhalocyclopentane wherein the alkyl group contains 1 to 10 carbon atoms, the improvement comprising preheating said catalyst system at a temperature between 100 to 140° F. and thereafter reacting said benzene with said ethylene in the presence of said preheated catalyst system at a temperature below said preheating temperature.

2. In a process for preparing a monoalkylated aromatic compound wherein benzene is reacted with ethylene in the presence of a catalyst system comprising an alkyl metal compound, a transition metal halide and an ethylhalocyclopentane wherein the alkyl group contains 1 to 10 carbon atoms, the improvement comprising preheating said catalyst system at a temperature between 100 to 140° F. in the presence of said benzene and said ethylene reactants and thereafter reducing the temperature to below said preheating temperature for a time sufficient to complete said reaction.

3. The process of claim 2 where the reaction is completed at a temperature below about 95° F.

4. A process for preparing monoalkylated aromatic compounds suitable for conversion into detergents which comprises first preparing a catalyst system by admixing an alkyl aluminum compound with a halohydrocarbon selected from the group consisting of alkylhalocyclopentanes wherein the alkyl group contains 1 to 10 carbon atoms and tertiary monohalides at a temperature between ambient and 150° F. to form a catalyst complex, adding to said catalyst complex a transition metal halide to form said catalyst system, preheating said catalyst system in the presence of ethylene at a temperature between 100° to 140° F. and reacting benzene with ethylene in the presence of said preheated catalyst system at a temperature below said preheating temperature.

5. A process in accordance with claim 4 wherein said halohydrocarbon is monochlorinated methylcyclopentane.

6. A process for preparing monoalkylated aromatic compounds which comprises preparing a catalyst system by first reacting monochlorinated methylcyclopentane with trialkylaluminum at a temperature between 60° and 100° F. to form a catalyst reaction product mixture, contacting said catalyst reaction product mixture with a titanium halide at a temperature between 60–100° F. to form a catalyst system, pretreating said catalyst system by contacting said catalyst system with ethylene at a temperature between 100° to 140° F. and subsequently reacting benzene with ethylene in the presence of said pretreated catalyst system at a temperature substantially lower than employed in said pretreating step.

7. A process in accordance with claim 6 wherein benzene is reacted with ethylene at a temperature below about 95° F.

References Cited in the file of this patent

UNITED STATES PATENTS 2,935,542   Minckler et al. _____ May 3, 1960